United States Patent
Chan (10) Patent No.: US 7,284,567 B2
(45) Date of Patent: Oct. 23, 2007

(54) LIQUID LEVEL CONTROLLER

(76) Inventor: Pong Kit Chan, No. 25, Jalan E, Off Jalan Kuching, Kuala Lumpur (MY) 52000

( * ) Notice: Subject to any disclaimer, the term of this patent is extended or adjusted under 35 U.S.C. 154(b) by 256 days.

(21) Appl. No.: 10/497,161

(22) PCT Filed: Aug. 26, 2002

(86) PCT No.: PCT/SG02/00191

§ 371 (c)(1),
(2), (4) Date: Jun. 8, 2004

(87) PCT Pub. No.: WO2003/050633

PCT Pub. Date: Jun. 19, 2004

(65) Prior Publication Data

US 2005/0039796 A1 Feb. 24, 2005

(30) Foreign Application Priority Data

Dec. 12, 2001 (MY) .................................. PI015647

(51) Int. Cl.
*F16K 31/18* (2006.01)
(52) U.S. Cl. ...................... 137/413; 137/414; 137/426
(58) Field of Classification Search ................ 137/413, 137/414, 426
See application file for complete search history.

(56) References Cited

U.S. PATENT DOCUMENTS

| | | | | |
|---|---|---|---|---|
| 1,302,538 A | * | 5/1919 | Gulick | 137/413 |
| 2,356,970 A | * | 8/1944 | Brockett | 137/413 |
| 2,777,398 A | * | 1/1957 | Carpenter | 417/111 |
| 3,144,874 A | * | 8/1964 | Goldtrap | 137/414 |
| 3,398,927 A | * | 8/1968 | Ruter | 251/228 |
| 3,554,219 A | | 1/1971 | Hudson | |
| 3,969,941 A | * | 7/1976 | Rapp | 73/290 R |
| 4,573,495 A | | 3/1986 | Rothe et al. | |
| 4,735,230 A | * | 4/1988 | Detloff | 137/315.08 |
| 5,280,803 A | * | 1/1994 | Swift et al. | 137/414 |
| 5,408,705 A | * | 4/1995 | Wodeslavsky | 4/366 |
| 5,738,141 A | | 4/1998 | Blanke et al. | |
| 5,904,176 A | * | 5/1999 | Li | 137/434 |
| 5,964,247 A | * | 10/1999 | Johnson | 137/414 |
| 6,047,725 A | | 4/2000 | Gish et al. | |
| 6,199,581 B1 | | 3/2001 | Gil | |
| 6,260,574 B1 | | 7/2001 | Nichols-Roy | |
| 6,332,475 B1 | * | 12/2001 | Brougham | 137/414 |
| 6,450,195 B1 | * | 9/2002 | Gil | 137/414 |
| 6,526,921 B1 | * | 3/2003 | Roffelsen | 122/406.1 |
| 6,679,285 B2 | * | 1/2004 | Pablo | 137/414 |

* cited by examiner

*Primary Examiner*—Eric Keasel
*Assistant Examiner*—Craig Price
(74) *Attorney, Agent, or Firm*—Bacon & Thomas PLLC (57) ABSTRACT

A liquid level controller for maintaining the level of liquid in a tank at a predetermined height includes a housing with an upper and lower section wherein the upper section is connected to a liquid supply and the lower section is submerged in liquid the level of which is to be maintained. The upper section includes a pressure chamber and an outlet chamber divided by a resilient material; a bore extending through the resilient material; and an inlet tube extending from the supply to the bore. A control valve controls the liquid flow through a hole providing communication between the pressure chamber and the lower part of the housing.

16 Claims, 6 Drawing Sheets

LIQUID LEVEL CONTROLLER

FIELD OF INVENTION

The present invention relates to a liquid level controller more particularly for maintaining the level of liquid preferably liquid in a tank, pool, reservoir, tub or the like at a predetermined height.

BACKGROUND OF THE INVENTION

The use of devices for preventing a toilet tank, liquid tank, swimming pool, reservoir or the like are known in the prior art. More specifically, devices for preventing a toilet tank or toilet flush system from overflowing or maintaining the level of water in a swimming pool heretofore devised and utilized are known to consist basically of familiar, expected and obvious structural configurations, notwithstanding the myriad of designs encompassed by the many prior art which have been developed for the fulfillment of countless objectives and requirements.

Known prior art of toilet/liquid tank overflowing or level control includes:

U.S. Pat. No. 4,082,110 discloses a modification to existing water closets of the type which uses a vertical float assembly that permits the user to select, each time the toilet is to be flushed whether a relatively small or relatively large amount of water will be required to flush the waste from the toilet bowl.

U.S. Pat. No. 6,021,807 discloses an apparatus for refilling a water tank to a preferred height. Said apparatus comprises a main float sliding along an inlet pipe and further having an extruder located at the bottom thereof for connecting with an extension bar and further connecting to a supporting bar and a water valve on top of the inlet pipe. The main float further includes a dual stair shape valley atop to accommodate an auxiliary float having a restraint cam located on top of the inlet pipe. The main float is kept in the water by the auxiliary float atop while in the early stage of the water feeding process, for accumulating enough buoyant energy, until the auxiliary float is drifted away, the accumulated buoyant energy in the main float is released suddenly for generating a huge pressure rapidly to block the water valve for stopping the water feeding process.

U.S. Pat. No. 5,740,561 discloses a water saving structure of a toilet bowl water tank where the said tank is disposed with a float ball valve for controlling a water outgoing valve. Other relevant documents JP6230831A2, JP7189304A2, JP11158855A2, U.S. Pat. No. 4,982,110.

Examples of prior art for devices to control the liquid level in pools and reservoir include:

U.S. Pat. No. 5,596,773 which discloses a portable swimming pool water level maintenance for releasable attachment to a swimming pool having a built-in skimmer. The device includes an upright conduit open at each end and having a conventional toilet ball cock valve and vertically slidable float assembly mounted there within.

U.S. Pat. No. 5,655,232 discloses a water level control device comprising a connector tubular housing one serving as a support for a hose connection and the other serving to house a float assembly for operation of a ball valve within the valve housing. An airtight float serves to raise the one extreme of a lever arm when buoyed by sufficient water level admitted through apertures in the float housing. The other extreme of the lever arm includes an upward projection that contacts a ball within the ball valve cavity urged against a lower valve seat by water pressure from a water hose.

U.S. Pat. No. 4,617,949 discloses an apparatus for monitoring and controlling the level of fluid in a reservoir. The apparatus utilises a fluid sensing probe to monitor the level of fluid in a reservoir. Other relevant documents include U.S. Pat. No. 5,921,267, JP59087518A2, U.S. Pat. No. 4,574,405, JP5248358A2.

While these devices fulfill their respective, particular objectives and requirements, the aforementioned patents do not disclose an apparatus that can be used for various applications such as in liquid tanks, toilet tanks, swimming pool, reservoir and the like for maintaining the liquid level without making modifications or changes to the said apparatus.

It is an object of the invention to provide a simple liquid level controller which can be easily installed to tanks such as toilet tank, cisterns, swimming pool or the like without requiring structural modification to the tanks or the apparatus during installation.

It is also a specific object of the invention to provide an apparatus that permits slight tolerance in the preferred level of liquid when used in swimming pools where the liquid constantly fluctuates due to surface waves.

It also an object of the present invention to provide such an apparatus which is relative inexpensive to manufacture. It is also a further object of the invention to provide an apparatus which is considerably light and compact in size.

Still another object of the invention to provide an adjustable means to control the preferred liquid level.

While these units may be suitable for the particular purpose to which they address, they would not be as suitable for the purposes of the present invention as heretofore described.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

In these respect, the liquid level controller apparatus according to the present invention substantially departs from the conventional concepts and designs of the prior art, and in so doing provides an apparatus of preventing a tank, swimming pool or the like with a mechanism to control the level of liquid in it at a predetermined height.

SUMMARY OF THE INVENTION

An improved liquid level controller comprising: a housing having an upper and lower section, wherein said upper section is detachably joined with liquid supply, whereby said housing is submerged within the liquid which level is to be maintained; a pressure chamber within said upper section, whereby said pressure chamber having a hole to provide liquid communication between the said pressure chamber and the inner part of the lower section of the said housing; a resilient material having a bore there through; an inlet tube extends from the supply to said bore; an outlet tube within said lower section of said housing; control valve controls the liquid flow through said hole of said pressure chamber; a displacer slidably mounted around said outlet tube; and a control pin with one end attached to said control valve and the other to said displacer to provide force to open said control valve. The lower section of the said housing is provided a controller with a thread having one end tied to said controller and the other end through the said control pin to said displacer to adjust preferred liquid level. The control chamber is provided a limit node protrudes within said control chamber for preventing said control valve being pulled further downward by said displacer.

The second embodiment of the invention comprising of a housing having an upper and lower section, wherein said lower section is detachably joined with liquid supply, whereby said housing is submerged within the liquid which level is to be maintained; a pressure chamber within said lower section, whereby said pressure chamber having a hole to provide liquid communication between the said pressure chamber and the inner part of the upper section of the said housing; a control chamber which extends upwardly through the upper section of said housing; a resilient material having a bore there through; an inlet tube extends from the supply to said bore; control valve controls the liquid flow through said hole of the pressure chamber; a displacer slidably mounted around said control chamber; and a control pin with one end attached to said control valve and the other to said displacer to provide force to open said control valve.

Another embodiment of the invention comprises: a housing wherein the upper end attached to a liquid inlet and the other end thereof submerged in liquid; said housing further comprising a path extending from the inlet to the outlet wherein a resilient material prevents continuous flow between the said inlet and outlet; said housing further comprising a vertically slidable displacer wherein the displacer includes weight at the upper section and float at the lower section to keep the said weights afloat; said displacer attached to a control pin; wherein when the liquid level lowers the displacer in line with the liquid level and in effect pulling the control pin which reduces the pressure on the opposite surface of the resilient material thus allowing continuous flow from the inlet to the outlet. In this embodiment an adjustable means is provided to control adjust the liquid level to a preferred level.

BRIEF DESCRIPTION OF THE DRAWINGS

FIGS. 2a and 2b show the cross section of the preferred embodiment of the present invention where FIG. 2a shows the apparatus in a container where the liquid is at the preferred height and FIG. 2b when the liquid level is lower than the preferred height.

FIG. 2c shows an exploded view of the valve assembly.

FIG. 2d shows the exploded view on the method to remove impurities that block the bore on the resilient material.

DETAILED DESCRIPTION OF THE DRAWINGS

Referring now to the drawings, wherein like reference numerals indicate identical or corresponding parts throughout the several views and figures.

Figure 1A:
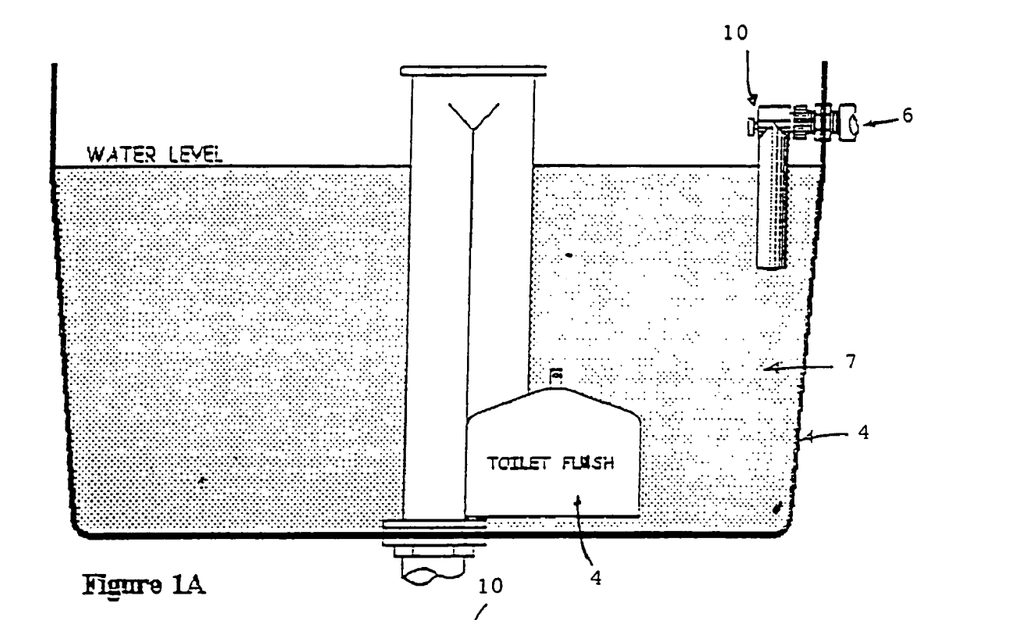
FIG. 1a shows the present invention mounted to a toilet flush.
Figure 1B:
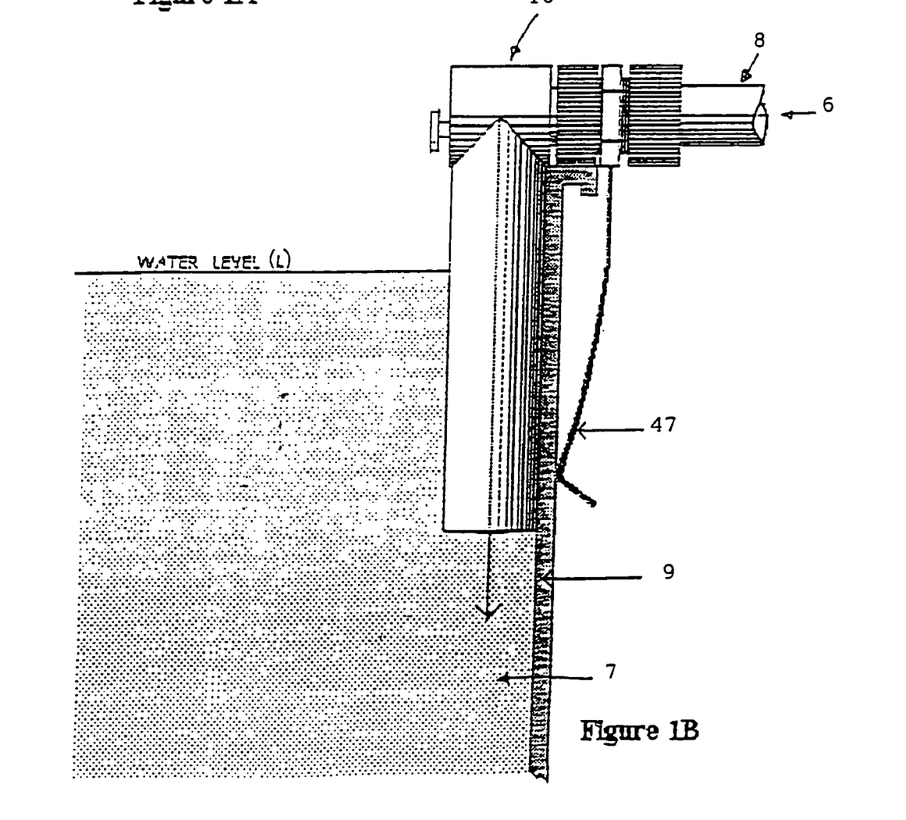
FIG. 1b illustrates the invention detachably fixed to the periphery of a tub, tank or the like to maintain the liquid level.

The apparatus used in both FIG. 1a and FIG. 1b are identical except for the mounting method. According to FIG. 1a, the said drawing illustrates the invention applicable to toilet flush tank or the like. As shown in the figure the apparatus (10) is mounted to a conventional toilet flush (4). The liquid level controller (10) according to the present invention can be fitted to most conventional toilet flush tank structure. The flush handle and mechanism for controlling the liquid outgoing valve is left as it is.

The use of conventional float ball and other bulky mechanism to control the level of liquid in the flush tank to prevent over flowing has been eliminated and replaced with a small compact and considerably light apparatus (10). The said apparatus (10) is mounted to the liquid supply (6) at the upper end whereas the lower section is partially submerged in the liquid (7) which level is to be maintained.

FIG. 1b illustrates the present invention used in a tub (9) or a container or the like where the liquid level control apparatus is detachably fixed at the periphery of the said tub. The inlet portion is joined to a hose (8) such as a garden hose as the inlet liquid supply. The hose is attached to the inlet pipe by an attachment means (49) with a flexible grip (47) enabling the device to be in stable condition. Although it is apparent that the liquid is water according to the above examples, the apparatus maybe used to maintain other liquid level such as oil or other liquid chemicals. However, the material used in making the apparatus (10) may have to vary according to the usage to avoid the liquid to react with the said material.

Figures 2A, 2B, 2C, 2D:
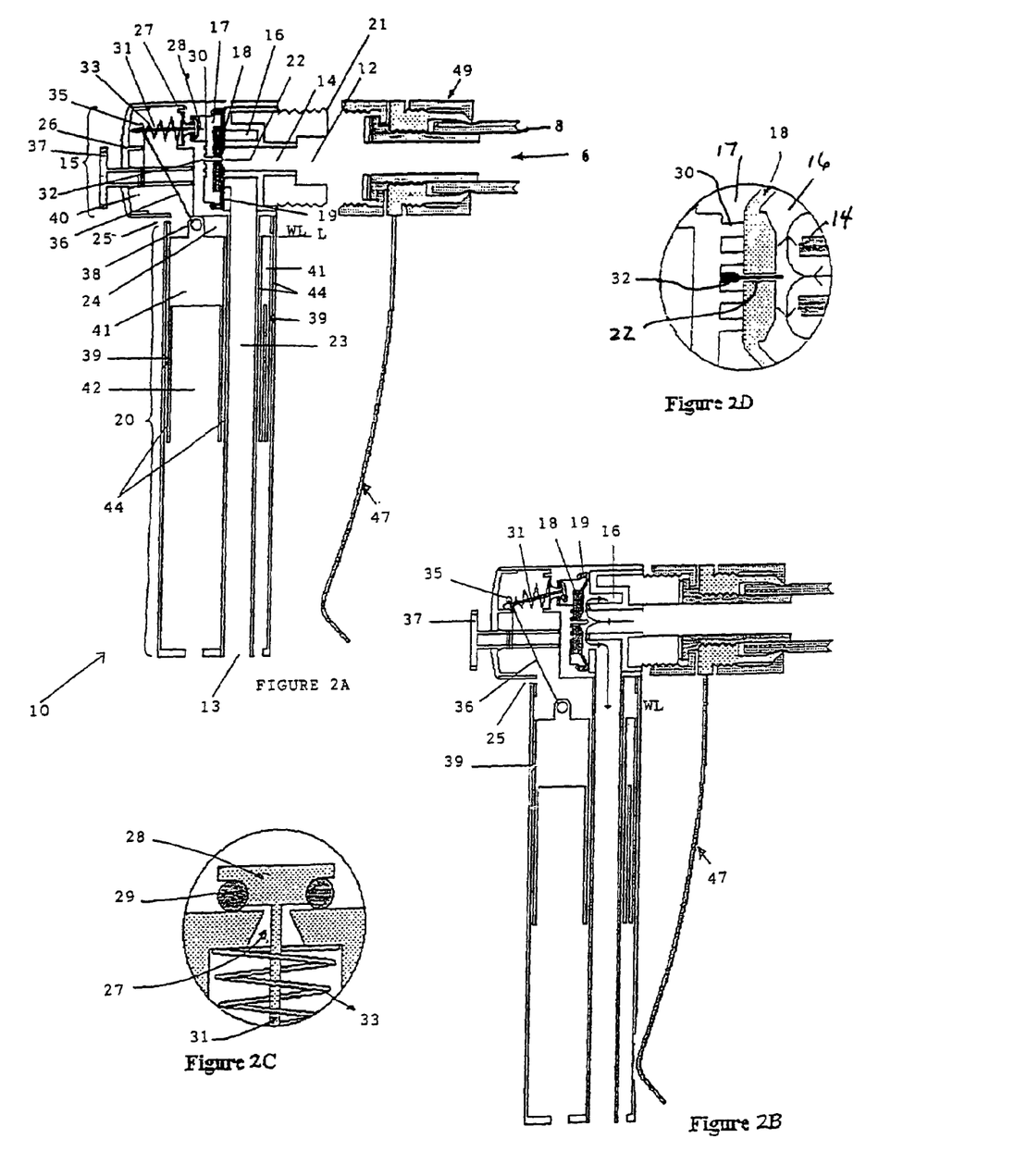

FIGS. 2a, 2b show the cross section view of the preferred embodiment of the present invention. The apparatus comprises an elongated cylindrical housing with one end forming an inlet path (12) to receive liquid from the source (6) or supply and the other end thereof as the outlet (13). The inlet path (12) is preferably at the upper section (15) of the housing and the outlet (13) at the lower section (20) which is partially submerged in the liquid (7) within the container (9) which preferred level (L) is to be maintained.

The upper section (15) of the housing includes an outlet chamber (16) and a pressure chamber (17) placed adjacent one another. The said chambers are separated by means of a resilient material (18). The material is preferably rubber and circularly shaped. The periphery (19) of the resilient material must be tightly secured between the two said chambers (16)(17). This is to prevent liquid sipping from the outlet chamber into the pressure chamber or vive versa. The resilient material has a bore (22) extending through it preferably at the center. The area around the bore is slightly thicker than the rest to prevent the resilient material from stretching too much when high liquid pressure is applied to it which will increase the diameter of the bore. The reason for wanting the diameter of the bore small will be explained later.

The inlet path (12) protrudes at right angle from the upper section of the cylindrical body. The outer diameter of the inlet path is threaded (21) to enable the device to be mounted to the source pipe (8). According to the diagram it shows an attachment means (49) with one end mounted to the inlet path (12) and the other end to the source pipe (8). An inlet tube (14) extends from the inlet path (12) through the outlet chamber (16) preferably through the central portion of the said chamber (16) and terminating at the resilient material (18) wherein bore (22) is within the periphery of the mouth of the inlet tube (14). It is again preferred for the bore (22) to be at the center of the said periphery. Since the resilient material (18) seals opening of the outlet chamber (16) and mouth of the inlet tube (14), the liquid from the supply (6) cannot flow through the inlet tube (14) to the outlet chamber (16). In other words the arrangement forms an inlet valve whereby liquid from the inlet tube is prevented to flow to the outlet tube by the resilient material. However, the liquid from the inlet tube (14) flows through bore (22) into the pressure chamber (17) at very low volume due to the small diameter of the bore (22).

Within the pressure chamber, a plurality of spaced projections (30) extends horizontally from the side of the inner housing structure towards the resilient material (18). Some space is provided between the ends of the projections (30) and the resilient material (18) so as to allow sufficient stretching of the resilient material (18) when liquid flows from the inlet tube (14) to the outlet chamber (16). The purpose of the said projections (30) is to prevent the resilient material (18) from over stretching when pressure from the liquid in the inlet tube (14) acts upon it. This prevents liquid from sipping through the periphery of the resilient material. In addition to the projections (30) the periphery of the resilient material has to be tightly secured to avoid the above problem.

It is preferred that a pin like structure (32) extend from the side of the inner housing structure amongst the projections (30). The said pin (32) partially penetrates into the bore (22) wherein the diameter of the tip of the pin (32) is slightly smaller than the diameter of bore (22). The said pin (32) is needed to prevent the bore (22) from being blocked by impurities or dirt from the source liquid (6). FIG. 2d describe the method of clearing the dirt. When dirt blocks the bore (22), the liquid is blocked from flowing to the pressure chamber (17). This creates pressure within the inlet tube (14) thus pushing the resilient material (18) to flow to the outlet chamber (16). When this happens that is the bore (22) of the resilient material (18) slides through the pin (32) as shown in the exploded view FIG. 2d where the tip of the pin (32) protrudes slightly out of the bore (22) pushing the dirt and washing it away. Instead of a pin (32), netting means (not shown) maybe placed at the beginning of the inlet tube to prevent dirt from flowing through.

The outlet chamber (16) within the upper section (15) is connected to outlet tube (23) which extends downwardly through the lower section (20) of the housing to the outlet opening (13) at the bottom end of the apparatus (10).

A control chamber (40) is housed adjacent the pressure chamber (17) and at the end of the upper section (15) of the housing. The pressure chamber (17) also includes a hole (27) which forms a pathway from the said pressure chamber (17) to the control chamber (40). The diameter of the hole (27) has to be larger than that of the bore (22) in order to improve the efficiency of the apparatus. The opening and closing of the hole (27) is controlled by valve assembly as shown in FIG. 2a & 2b. As shown a plug (28) with a rubber 'O' ring (29) around covers the hole. The upper surface of the said plug is flat and is subjected to the pressure from the liquid in the pressure chamber (17) in order to constitute a liquid tight seal therewith. The opposite surface of the said plug (28) is connected to a control pin (31) wherein the control pin (31) passes through the hole (27) and spring (33) as illustrated in the diagram. The other end of the control pin (31) is a ring (35). A bore is provided at the end of the upper section (15) of the housing to enable a controller (37) to be secured into the upper section (15) of the housing. A thread (36) with one end tied around the body of the controller (37) to enable user to adjust the preferred liquid level, passes through the ring (35) on the control pin (31) to a hook (38) mounted on a displacer (39) at the lower section (20) of the said housing. The preferred liquid level is adjustable by adjusting the length of the thread (36) by controlling the said controller (37) from outside of the said apparatus (10). A limit node (26) is a slight protrusion within the control chamber (40) for the purpose of preventing the control valve from being pulled further downward.

The displacer is slidably mounted around the inner housing (24) allowing it upward/downward movement within the lower section (20) of the housing. In other words the outlet tube (23) telescopes into the displacer (39). According to the embodiment of FIG. 3 the displacer (39d) is beside the outlet tube (23d) within the housing of the lower section.

The said displacer (39) includes at the top part, weight (41), preferably a solid body (41) molded by the material used to make the apparatus for example plastic and the bottom part forms a float (42). The float (42) in contrast is a hollowed body with preferably air within the hollowed section to provide sufficient buoyancy to the weight (41) to ensure that the tip of the top part of the displacer (39) is at the liquid level (L). The solid body (41) has to be heavy enough to pull down the control pin (31) when the liquid level (L) is below the preferred height via the thread (36) thus opening hole (27) to allow liquid to flow from the pressure chamber (17) to the inner housing (24) of the lower section.

However, it is preferred to have the solid body (41) as light as possible so that the whole apparatus (10) is considerably light. The following features are responsible for reducing the weight of the solid body (41) that provides the downward force;
i) The sideward movement of the of the plug on the control pin requires less force compared to moving it vertically upward;
ii) Passing thread (36) through a loop; this requires half the force for pulling the control pin compared to pulling directly as shown in the embodiment according to FIG. 3;
iii) The plug when moved sideways levers on the rubber 'O' ring thus requires less effort to lift the plug.

A ventilation outlet (25) is provided within the lower section (20) of the housing that is slightly below the pressure chamber (17). This is to ensure that the air within the lower section (20) of the apparatus (10) is at atmospheric pressure when the apparatus is submerged in liquid. By doing so the liquid level within the housing as well as outside the housing will be at the same height.

Accordingly, when liquid flows through the inlet tube (14) to the resilient material (18), the liquid flows through a bore (22) on the said resilient material (18) to the pressure chamber (17) until the chamber is filled. When the liquid level drops the similar to the earlier embodiments the control pin (31) is moved thus opening bore (22) which reduces the pressure in the chamber. This allows the inlet liquid to push the resilient material (18), allowing liquid to flow from the inlet to the outlet tube. Once the desired level is reached then the bore is blocked and the process repeated. A pin (32) extends from the body within the pressure chamber to the bore of the resilient material (18) in order to act as a filter where when dirt from the liquid supply clogs the bore (22)

and the resilient material (18) is in expanded form the pin pushes the dirt from the hole to the outlet tube.

Accordingly, when the apparatus (10) is not in use the displacer (39) slides to the tip of the outlet whereby the diameter of the opening at the outlet around the tip of the outlet tube is smaller than the diameter of the displacer (39) as shown in FIG. 2b. This prevents the displacer (39) from sliding out of the housing. When the displacer (39) is at this position, the ringed (35) end of the control pin (31) is pulled downward via the looped thread (36) in effect lifting the other end of the control pin (31) upwards thus opening the control valve.

The whole apparatus (10) is mounted to the inner wall of a container with the inlet tube (12) connected to liquid supply (6). According to FIG. 2b liquid from the supply flows through the inlet tube (14) towards the resilient material (18). Since the liquid pressure within the inlet tube (14) increases and due to the fact that the pressure chamber (17) is at atmospheric pressure, the liquid within the inlet tube pushes the resilient material (18) thus opening the inlet valve. Said liquid then flows into the outlet chamber (16) and through the outlet tube (23) to the container to be filled. Liquid also flows through bore (22) into the pressure chamber (17). In the pressure chamber the liquid flows through the control chamber (40) through hole (27) into the lower section of the housing (24) and eventually flows out to the container through the space (44) between the displacer (39) and the structure of the apparatus.

The liquid fills the container continuously. As the level of liquid within the container rises, the displacer (39) within the apparatus (10) also rises due to the buoyancy from the float. The upward movement of the displacer reduces the downward force on the ringed end (35) of the control pin (31). Once the downward force is not present that is when the displacer (39) rises to a height where it does not have pulling effect on the ringed end (35) of the control pin (31), the control valve closes. The spring is placed as shown in the diagram to enable the plug (28) to move back to its original position.

Liquid flowing into the pressure chamber (17) through bore (22) as explained earlier, starts to accumulate within the said chamber thus creating pressure. Once the pressure chamber (17) is filled with liquid, the pressure within the inlet tube (14) and the pressure chamber (17) is equivalent. However, since area of the resilient material (18) upon which is subjected to the pressured liquid is larger within the pressure chamber than the inlet tube, the force acting upon the resilient material (18) pushing it towards the inlet tube will also be greater then the force acting to push it away from the inlet tube, thus, closing the inlet valve. The closure of the said valve prevents flow of liquid from the inlet tube (14) to the outlet chamber (16). The liquid within the container will be maintained at substantially that level. If the user prefers the liquid to be at a different level then the height at which the apparatus is mounted within the container has to be changed accordingly.

If the apparatus is used in a swimming pool then slight tolerance to the desired water level will be provided to avoid the constant opening and closing of the inlet valve due to the constant fluctuations of the water surface when the pool is being used. However, the said tolerance level will be dependent on the on the length of the thread used.

When the level of liquid within the container reduces then the displacer (39) slides downward, pulling the ringed end (35) of the control pin via the thread (36). As mentioned earlier this will open the control valve, almost instantly reducing the pressure within the pressure chamber and releasing the liquid within the said chamber through the control chamber (40) through hole (27) to the lower section of the housing.

Since the pressure within the inlet tube (14) is greater than the pressure chamber (17), the liquid within the inlet tube (14) pushes the resilient material (18) away from the mouth of the inlet tube. Liquid the flows continuously from the inlet tube to the outlet chamber (23) then tube to fill the container. When the desired level is reached then as mentioned earlier the control valve closes and the process repeated.

Figure 3A:
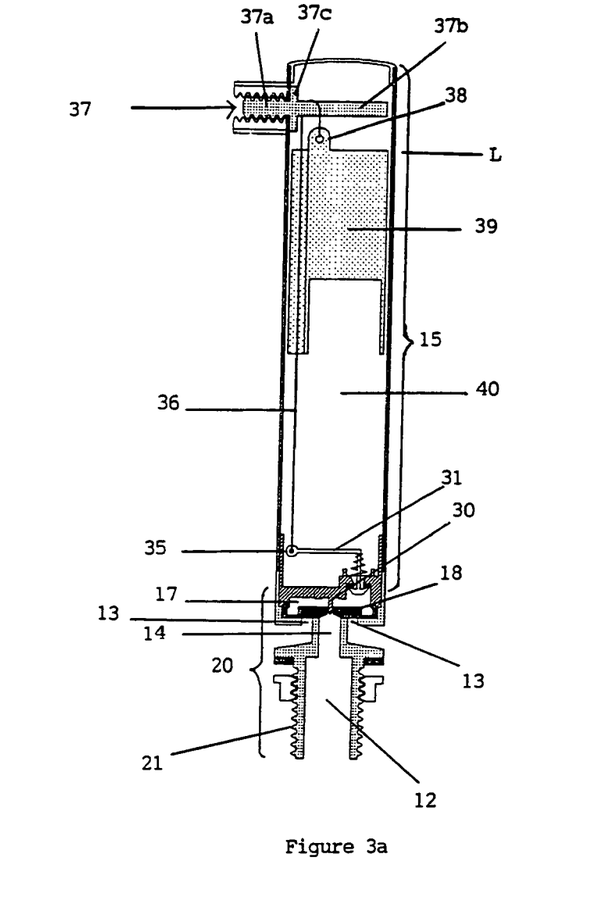
FIG. 3a shows the show the cross section of the second embodiment of the present invention.
Figure 3B:
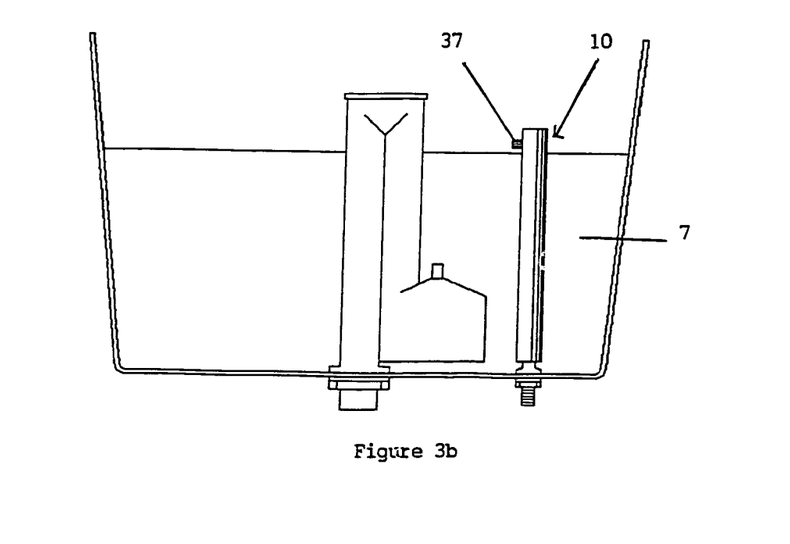
FIG. 3b shows the second embodiment of the present invention mounted from the periphery of a tub, tank or the like to maintain the liquid level.

FIG. 3a shows the cross sectional view of the second embodiment of the present invention. The said second embodiment is secured from the bottom of the container and submerged in the liquid up to the preferred liquid level L as shown in FIG. 3b. The apparatus comprises an elongated cylindrical housing with the lower section end forming an inlet path (12) to receive liquid from the source (6) or supply and the controller (37) preferably at the upper section of the housing. The lower section (20) of the housing includes inlet tube (14) and a pressure chamber (17) placed adjacent one another. The said pressure chamber (17) and inlet tube (14) are separated by means of a resilient material (18). The outer diameter of said inlet path (12) is threaded (21) to enable the device to be mounted to the inlet path. Said resilient material (18) having a bore (22) through the central position of said resilient material (18) and within the periphery of the mouth of inlet tube (14). Liquid from the inlet tube (14) flows through the bore (22) into the pressure chamber (17) at very low volume due to the small diameter of the bore (22). The resilient material (18), the projections (30), the pinkie structure (32), the plug (28), the displacer (39) are similar to those of the first embodiment in construction.

The pressure chamber (17) within the lower section. (20) is connected to the control chamber (40) which extends upwardly through the upper section (15) of the housing as shown in FIG. 3a. The pressure chamber (17) of the housing includes at least one outlet opening (13) which is closed by said resilient material (18) and a hole (27) which forms a pathway from said pressure chamber (17) to the control chamber (40). At the upper end of said control chamber (40) is provided an elongated bore (not shown) extends downwardly to substantially middle of said control chamber (40) to enable said controller (37) to be slidably fixed along said elongated bore. The said controller (37) comprises a controller head (37a) which protrudes horizontally out from said control chamber (40) through said elongated bore and a controller body (37b) includes a controller retainer (37c) to prevent said controller body to further protrudes out of said control chamber (40). Said controller head (37a) is threaded for enabling a fastener to secure it in place. A displacer (39) slidably mounted around the said control chamber (40) allowing it upward and downward movement within the upper section (15) of said housing. A thread (36) with one end tied from a hook (38) mounted on said displacer (39) hanging over said controller body (37b) of said controller (37) to a ring end (35) of the control pin (31), enable user to adjust the preferred liquid level. The displacer (39) is similar to the first embodiment in construction.

When liquid level drops the control pin (31) is moved and opening the bore (22) which reduces the pressure in the pressure chamber (17). This allows the inlet liquid to push the resilient material (18) allowing the liquid to flow from the inlet through the outlet opening (13) to the container to be filled and through the pressure chamber (17) to the control chamber (40). As the level of liquid within the container rises, the displacer (39) within the housing also rises due to the buoyancy from the float. The mechanism of said second embodiment is similar to those of the first embodiment.

Figures 4A, 4B, 4C:
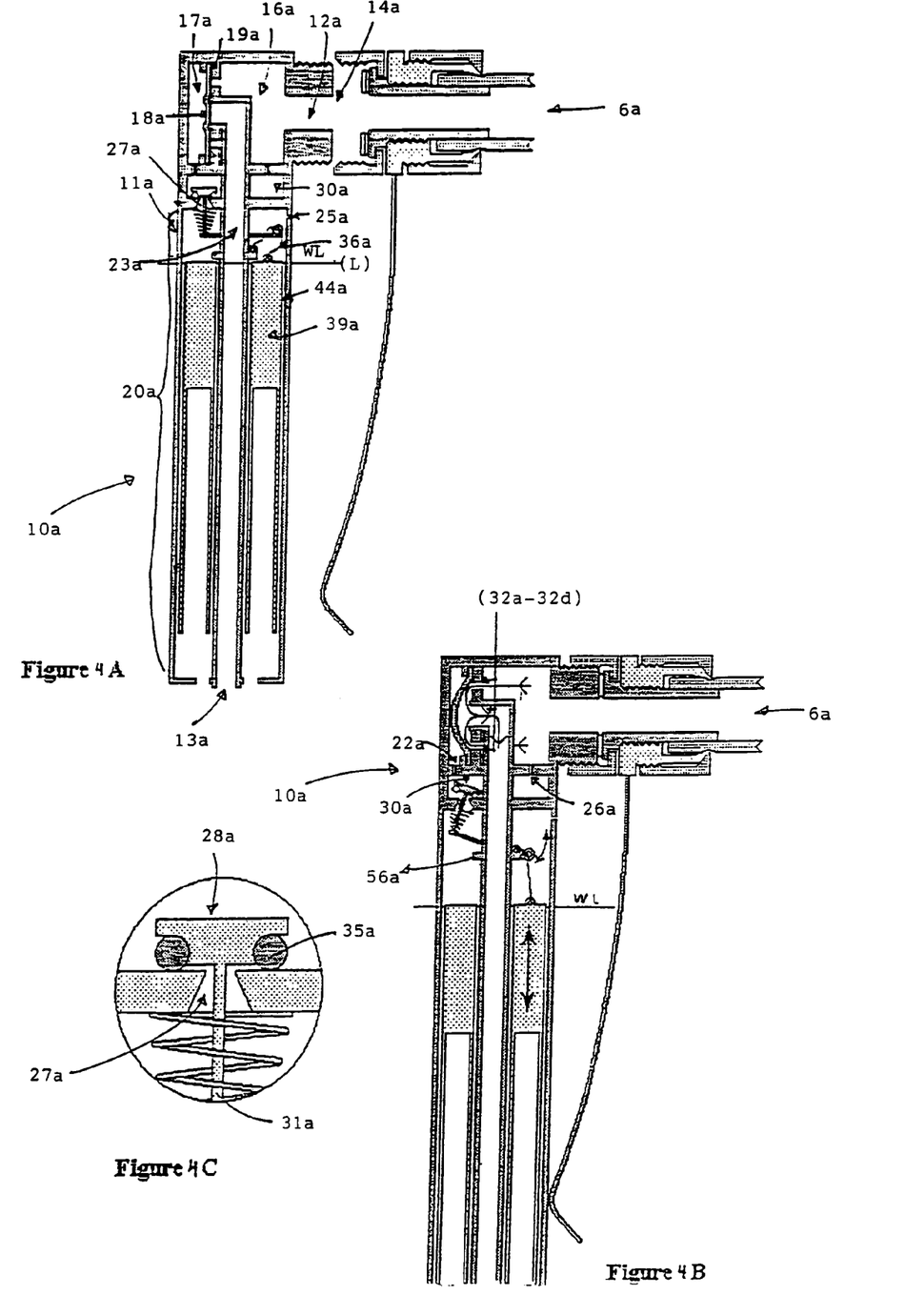
FIGS. 4a and 4b show the cross sectional view of another embodiment of the invention when path between the inlet and outlet is closed and opened respectively.
FIG. 4c shows the exploded view of the valve assembly.

FIGS. 4a, 4b and 4c illustrate another embodiment of the present invention. As shown the apparatus (10a) comprises an elongated cylindrical housing (11a) with one end forming an inlet (12a) to receive the liquid from source (6a) and another as an outlet (13a). Preferably, the inlet is at the upper end of the apparatus and is mounted to liquid supply and the other end thereof submerged in the liquid which preferred level (L) is to be maintained. The inlet (14a) includes an inlet tube (12a) that extends from the mounted liquid supply piping or hose to an inlet chamber (16a). Beside the inlet chamber is the pressure chamber (17a). A resilient material (18a) is placed between the said chambers in order to prevent direct flow of liquid from the inlet chamber (16a) to the pressure chamber (17a). The periphery of the circular resilient material should be properly secured between the chambers to avoid liquid from sipping from one chamber to the other through the edge (19a) of the resilient material.

An outlet tube (23a) extends from the center of the resilient material (18a) through the inlet chamber (16a) then downwardly through the control chamber (30a) and the lower section (20a) of the housing until the outlet (13a).

The inlet chamber is covered, at the end pressed against the resilient material with at least one bore on the said covered section to allow the liquid in the inlet to flow through.

Figures 6A, 6B, 7:
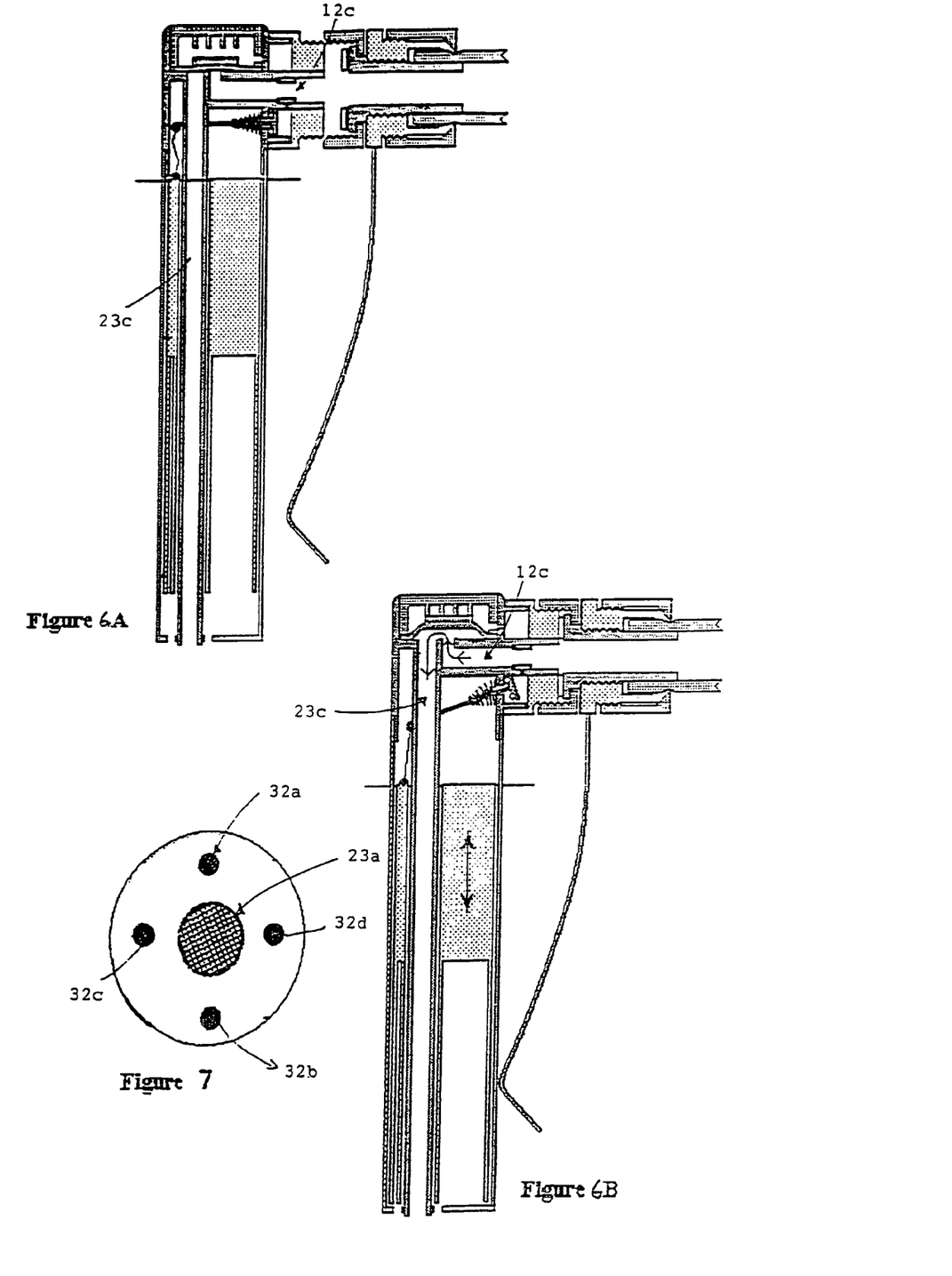
FIGS. 6a and 6b illustrates yet another embodiment with difference in the manner the inlet and outlet pipe face the resilient material.
FIG. 7 illustrates the plurality of inlet bores on the covered section of the inlet chamber and the outlet aperture can be seen at the center.

According to the present embodiment the covered section of the inlet has four bores (32a-32d) as shown in FIG. 7. The center aperture is the outlet tube (23a). It is preferred that the accumulation of the area of the bores on the covered section be less than the area of the outlet tube aperture.

A control chamber (30a) is housed between, both the pressure chamber (17a) and the inlet chamber (16a), and the lower section (20a) of the housing. Bore (26a) forms a pathway between the inlet chamber (16a) and the control chamber (17a) whereas bore (22a) leads the pressure chamber to the control chamber. Hole (27a) that allows liquid flow from the control chamber (30a) to the lower section (20a) of the housing. The accumulation of the area of both the bores (22a), (27a) should be smaller than the area of the hole (27a).

Hole (27a) acts as a control valve with a valve assembly that opens and closes the said hole depending on the liquid level (L). The valve assembly and the displacer (39a) within the lower section of the housing are similar to the preferred embodiment as shown in FIGS. 2a and 2b. However, the outlet tube extends centrally within the lower section of this embodiment unlike the earlier embodiment where the outlet tube is slightly away from the center axis. Although both embodiments work but the displacer (39a) according to the second embodiment may rotate around the outlet tube (23a) thus pulling the thread (36a) even though the level of liquid (L) is at the preferred height. The displacer (39a) according to the first embodiment cannot rotate around the outlet tube (23a), therefore the above drawback does not occur in this arrangement.

A limit node (56a) is a slight protrusion around the outlet tube (23a) for the purpose of preventing the displacer (39a) from sliding further upward. A ventilation outlet (25a) is provided just below the control chamber.

When the apparatus (10a) is not in use the displacer (39a) slides to the tip of the outlet whereby the diameter of the opening at the outlet around the tip of the outlet tube is smaller than the diameter of the displacer (39a). This prevents the displacer (39a) from sliding out of the housing.

When the displacer (39a) is at this position, the ringed (35a) end of the control pin (31a) is pulled downward via the looped thread (36a) in effect lifting the other end of the control pin upwards thus opening hole (27a).

The whole apparatus (10a) is mounted to the inner wall of a container with the inlet tube (12a) connected to liquid supply (6a). By varying the height of the apparatus within the container changes the height of the water level where the limit node of apparatus (10a) will be in line with the water level when the container is filled.

According to FIG. 4b liquid from the supply flows through the inlet tube (12a) to the inlet chamber (16a). When the liquid fills the inlet chamber (16a), the pressure of the liquid pushes the resilient material (18a) away from the inlet chamber (16a) thus opening the bores (32a-32d) to allow the liquid to flow into the outlet tube (23a) to the container to be filled.

The liquid in the inlet chamber (16a) also flows in low volume through bore (26a) into the control chamber (30a). It then flows through hole (27a) since the control valve is in open state, to the lower section of the housing. The liquid then flows through the space (44a) between the displacer and the structure of the apparatus to the outlet (13a). Since the diameter of the bore (22a) is smaller than the diameter of hole (27a), liquid that flows into the control chamber flows out through the hole quickly without accumulating any liquid, leaving the pressure chamber (17a) empty and at atmospheric pressure.

Once the liquid in the container reaches the preferred level (L) where it is the same height as the limit node (56a) of the apparatus, the control valve is shut due to the upward movement of the displacer (39a) and control pin (31a). Liquid starts accumulating in the control chamber since hole (27a) is blocked. When filled the liquid pressure within the control chamber (30a) pushes liquid into the pressure chamber (17a) through bore (22a). This creates pressure within the pressure chamber (17a) thus pushing the resilient material (18a) back in place which prevents liquid flow from the inlet chamber (16a) through the bores (32a-32d) to the outlet tube (23a). The liquid level in the container is therefore maintained.

When the liquid level (L) in the container reduces then the displacer (39a) slides downward in line with the liquid level, while pulling the control pin (31a) which opens the control valve thus opening hole (27a) as mentioned in the earlier paragraphs.

Once the valve is opened, the liquid within the pressure chamber (17a) and the control chamber (30a) flow forcefully into the lower section of the housing. This action reduces the pressure within the said two chambers instantaneously. Since the accumulation of both the areas of bores (22a) and (26a) is smaller than the area of hole (27a), liquid does not accumulate within the control chamber (30a). The liquid within the inlet chamber again pushes the resilient material (18a) away since the pressure in the pressure chamber (17a) is lower than that within the inlet chamber (16a). The container is filled until the preferred liquid level is reached and the process is repeated.

Figures 5A, 5B, 5C:
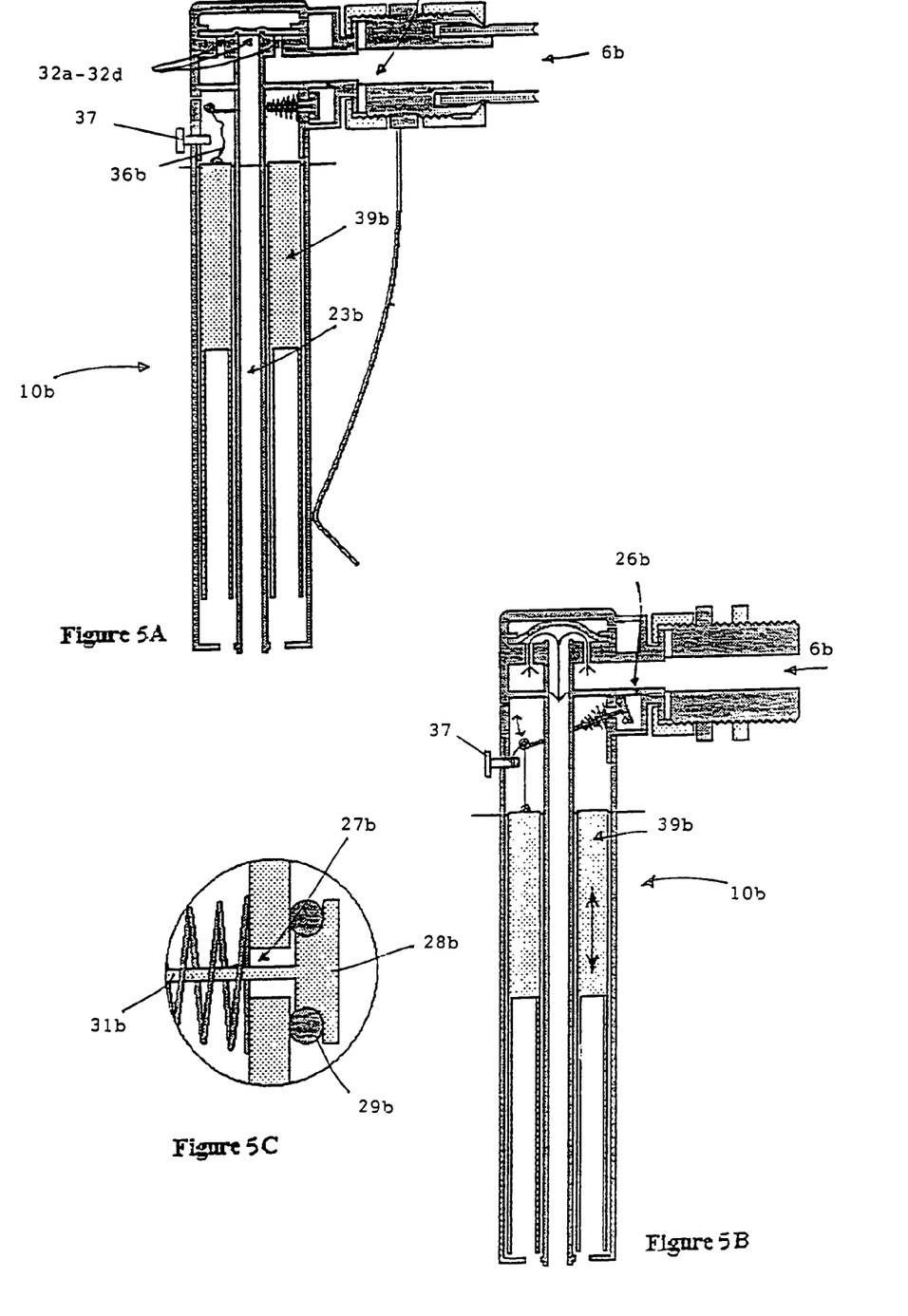
FIGS. 5a and 5b illustrates yet another embodiment with several of the chambers of FIGS. 4a and 4b placed at different position to achieve the desired function.
FIG. 5c shows the exploded view of the valve assembly.

FIGS. 5a and 5b work in the same principle as the above embodiments with changes only to the position of the pressure and control chambers. The liquid level of this embodiment also can be adjustable to a preferred level by controlling the screw means (37).

As shown in FIG. 5b when the liquid level within the container is below the preferred level, the displacer (39b) slides downward pulling the control pin (31b) by means of a thread (36b). Similar to the working principles of the earlier embodiment, the liquid flowing from the supply flows through the said inlet tube (12b) into the inlet bores (32a-32d) then downwardly to the outlet tube (23b). The liquid at the inlet section also flows to control chamber through bore (26b) and then flows out through hole (27b). Once the preferred level is attained in the container, the control valve closes hole (27b). Liquid gradually fills the control chamber and arises to the pressure chamber. Similarly, as the earlier embodiment the resilient material moves back in place covering the inlet bores which prevents flow of liquid from the inlet to the outlet. The apparatus will be in this state until the water level in the container reduces and similar function as the earlier embodiment is repeated.

The plug (28b) when pushed is pushed sidewardly while pivoting on the 'O' ring (29b). Since the movement is not in upward or vertical direction, less weight is required to displace the plug (28b) thus opening the hole (27b).

FIG. 6 illustrates the above embodiments but changes are made to the manner the inlet (12c) and outlet tube (23c) face the resilient material. The outlet tube is placed beside the inlet bores of the outlet tube instead of extending centrally.

It is to be noted that the drawings and description herein are merely to exemplified the invention and do not represent the only and whole range of embodiments of the invention which is capable of many combinations of methods and of the various embodiments' features described herein. Each of the feature described may be varied, modified or adapted by a person skilled in the are without departing from the working principle or spirit of the invention which scope is defined in the following claims.

The invention claimed is:

1. A liquid level controller comprising:
a housing having an upper and lower section, said upper section being adapted to be detachably connected to a liquid supply, and wherein a portion of said lower section is adapted to be submerged within a liquid the level of which is to be maintained;
a pressure chamber within said upper section, said pressure chamber having a hole to provide liquid communication between the said pressure chamber and an inner part of the lower section of the said housing;
a seal made of resilient material having a bore there through;
an inlet tube having an outlet and extending from the liquid supply to said bore;
said seal located between the inlet tube outlet and the pressure chamber;
an outlet tube within said lower section of said housing;
a displacer slidably along said outlet tube;
a valve assembly for controlling liquid flow, said valve assembly including a control valve and a control pin having one end attached to the control valve and another end coupled to said displacer, wherein said displacer acts as a weight movable to tip said control pin and said control valve to open said control valve when a liquid level is below a level to be maintained, and wherein said displacer floats to remove tipping of the control pin and control valve to close said control valve when the liquid level to be maintained is reached;
wherein said lower section of said housing includes a controller and a thread having one end connected to said controller and another end extending through said control pin and to said displacer for enabling adjustment of a preferred liquid level.

2. The liquid level controller as claimed in claim 1, wherein said outlet tube has an outlet opening diameter smaller than the diameter of the said displacer.

3. The liquid level controller as claimed in claim 1, wherein said control valve is a plug with rubber 'O' ring around it and wherein said plug is connected to one end of the control pin; and a spring associated with the control pin biasing the valve assembly to revert to its original position.

4. The liquid level controller as claimed in claim 1, wherein said inlet section of the apparatus and the liquid supply is connected by an attachment device having a flexible grip mounted thereon to provide stability when the liquid level controller is mounted to the wall of a liquid container.

5. The liquid level controller as claimed in claim 1, wherein said displacer includes a weight at a top part thereof and a float at a bottom part thereof, said float comprising a hollow body providing buoyancy to the said weight when said weight is submerged in water.

6. The liquid level controller as claimed in claim 1, wherein said control pin comprises a ring for said thread to pass there through so as to reduce the pulling force by the displacer.

7. The liquid level controller as claimed in claim 1, wherein said pressure chamber includes projections extending towards a surface of the seal opposite the inlet tube outlet.

8. The liquid level controller as claimed in claim 7, wherein said pressure chamber includes a pin like structure extending between said projections toward the center of bore in the said seal.

9. The liquid level controller as claimed in claim 1, wherein said upper section of said housing comprises a control chamber at the end of said upper section.

10. The liquid level controller as claimed in claim 9, wherein said control chamber comprises a limit node protruding into said control chamber for preventing said valve assembly being pulled excessively downward by said displacer.

11. A liquid level controller comprising:
a housing having an upper end attached to a liquid inlet and a lower end adapted to be submerged in liquid;
said housing further comprising a path extending from the inlet to a liquid outlet, and a seal made of resilient material preventing continuous flow between the said inlet and outlet;
said housing further comprising a vertically slidable displacer including weight at an upper section thereof and a float at a lower section thereof to keep the said weight afloat;
said displacer attached to one end of a control pin and the other end of said control pin coupled to a control valve;
wherein when a liquid level is below a level to be maintained, said displacer acts as a weight transmitting motion to tip said control pin and said control valve to open said control valve thereby reducing the pressure on an opposite surface of the seal to permit continuous flow from the liquid inlet to the outlet;
wherein said control pin includes a ring attached at said end of the control pin which is coupled to said displacer.

12. The liquid level controller as claimed in claim 11, wherein the upper section of said outlet is blocked by a central portion of said seal.

13. The liquid level controller as claimed in claim 11, wherein said inlet is mounted at an outer periphery of said upper section of the outlet facing said seal.

14. The liquid level controller as claimed in claim 11, wherein said control pin is 'L' shaped.

15. The liquid level controller as claimed in claim 11, wherein said seal is rubber.

16. A liquid level controller comprising:
   a housing having an upper end attached to a liquid inlet and a lower end adapted to be submerged in liquid;
   said housing further comprising a path extending from the inlet to a liquid outlet, and a seal made of resilient material preventing continuous flow between the said inlet and outlet;
   said housing further comprising a vertically slidable displacer including weight at an upper section thereof and a float at a lower section thereof to keep the said weight afloat;
   said displacer attached to one end of a control pin and the other end of said control pin coupled to a control valve;
   wherein when a liquid level is below a level to be maintained, said displacer acts as a weight transmitting motion to tip said control pin and said control valve to open said control valve thereby reducing the pressure on an opposite surface of the seal to permit continuous flow from the liquid inlet to the outlet; and
   wherein said housing is provided with a controller mounted at the lower end of said housing and a thread having one end tied to said controller and the other end extending through the said ring of the control pin and to said displacer for enabling adjustment of a preferred liquid level.

* * * * *